Jan. 14, 1930. G. C. BEIDLER 1,743,311
PHOTOGRAPHING APPARATUS
Filed Feb. 2, 1927 4 Sheets-Sheet 4
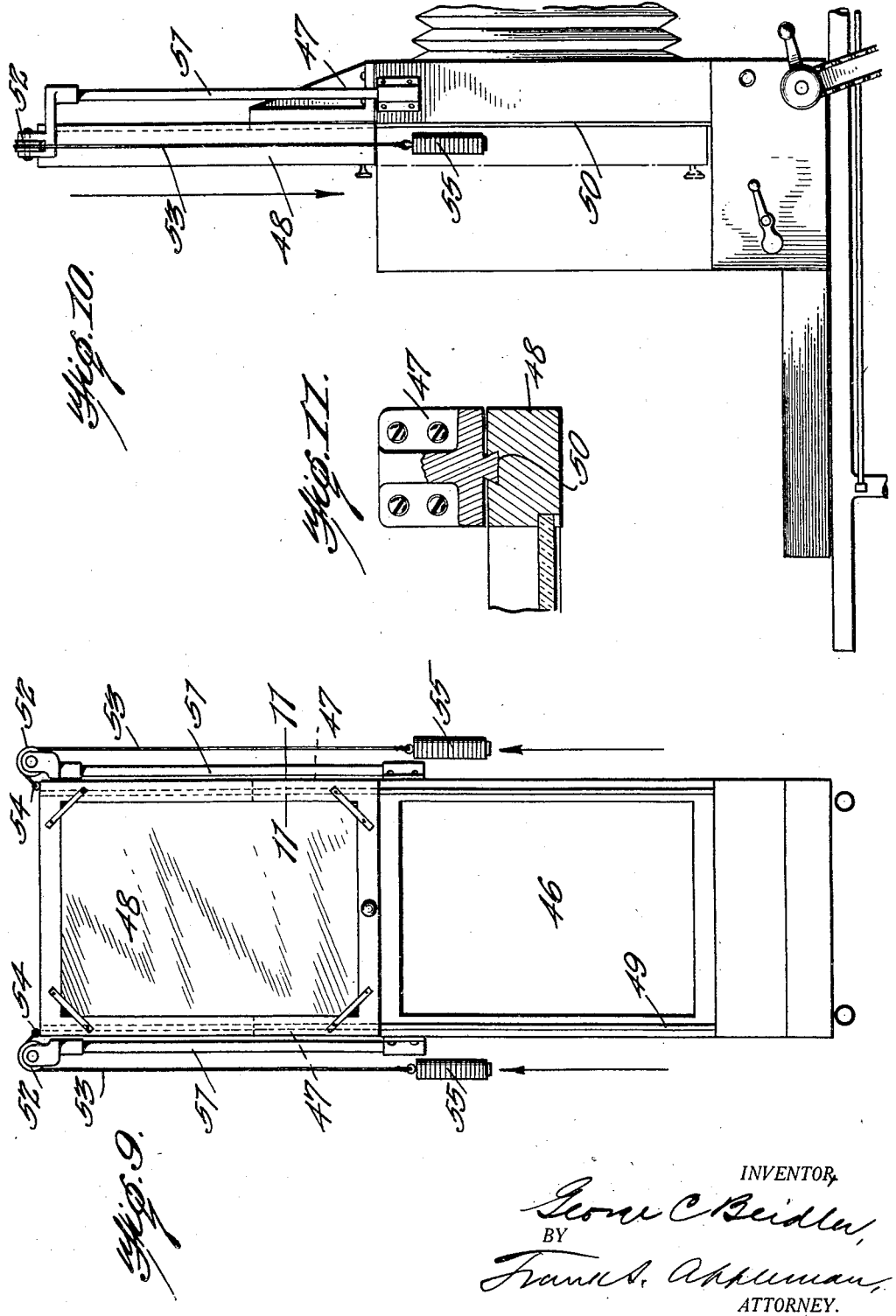
INVENTOR.
George C Beidler,
BY
Frank A. Appleman,
ATTORNEY.

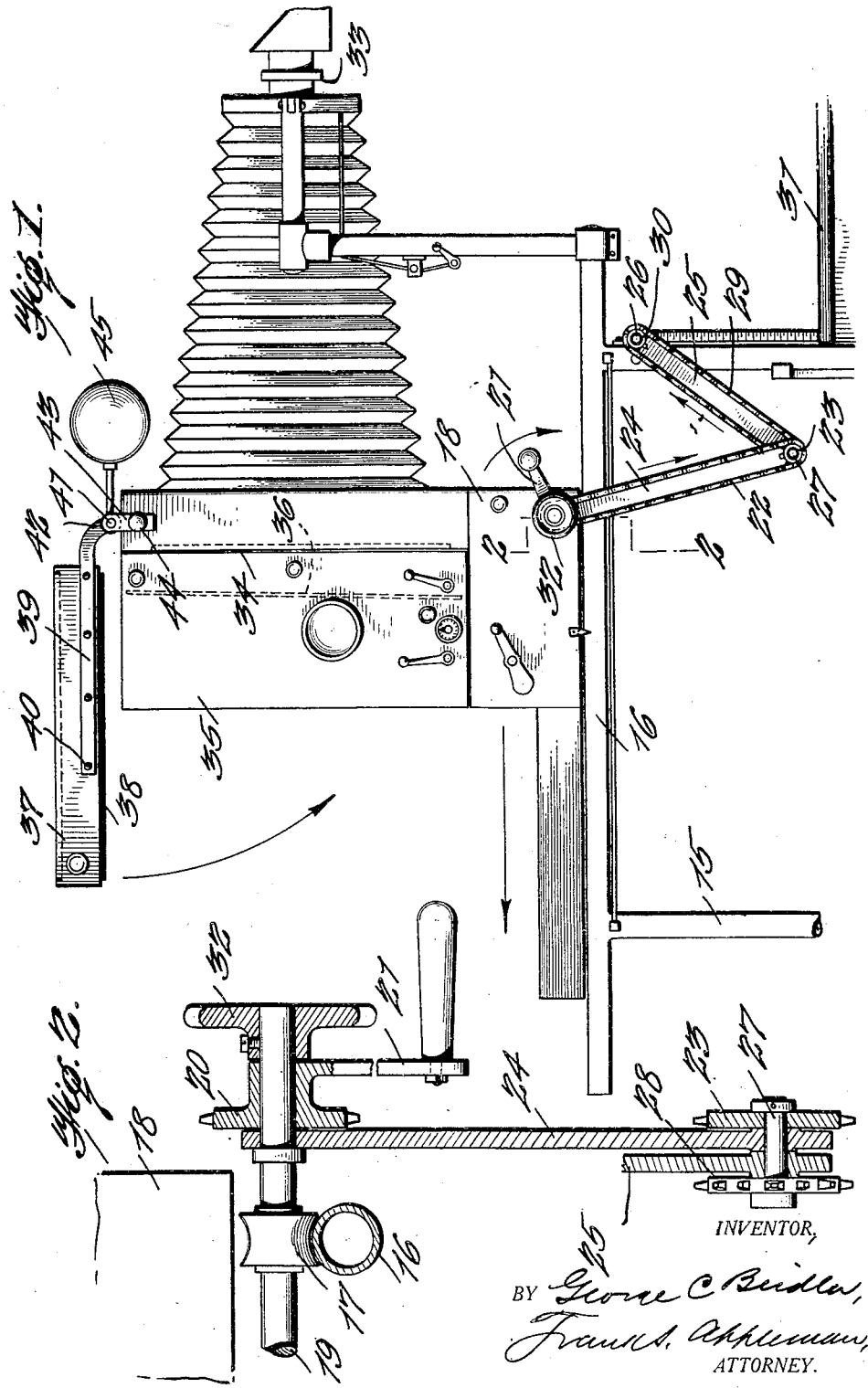

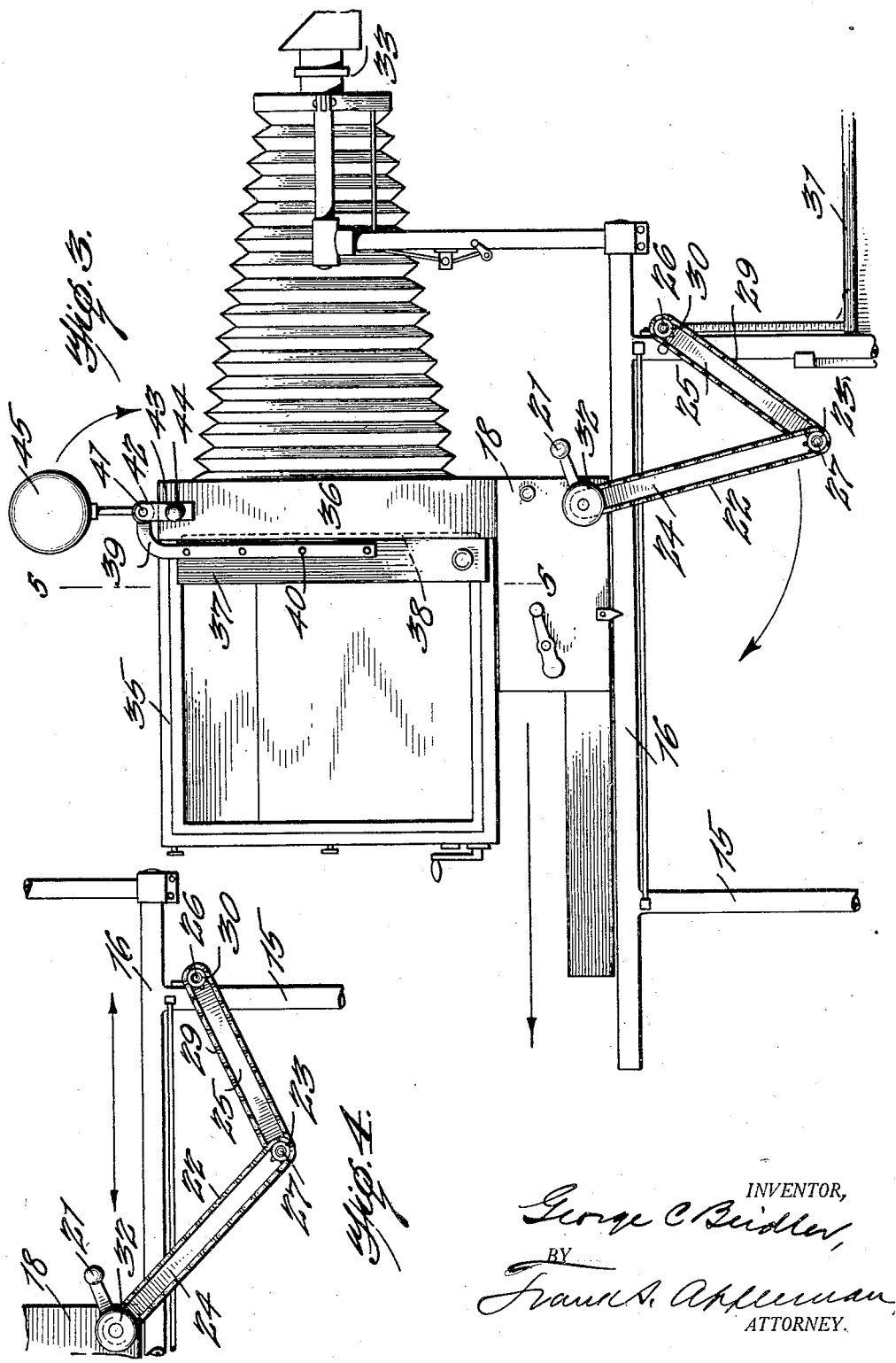

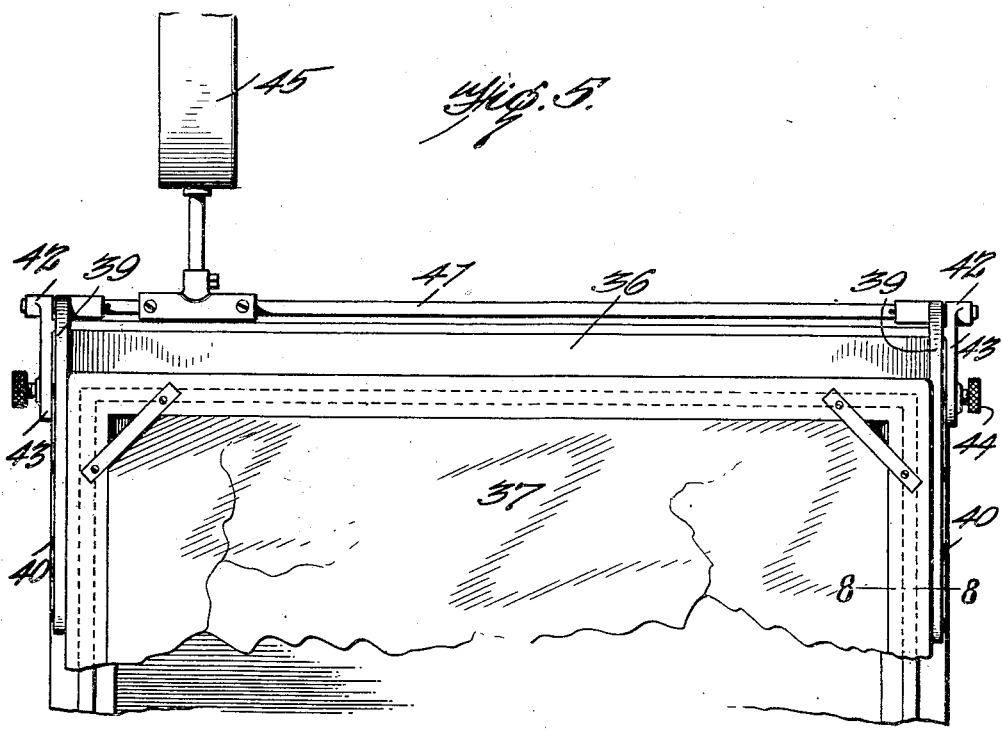
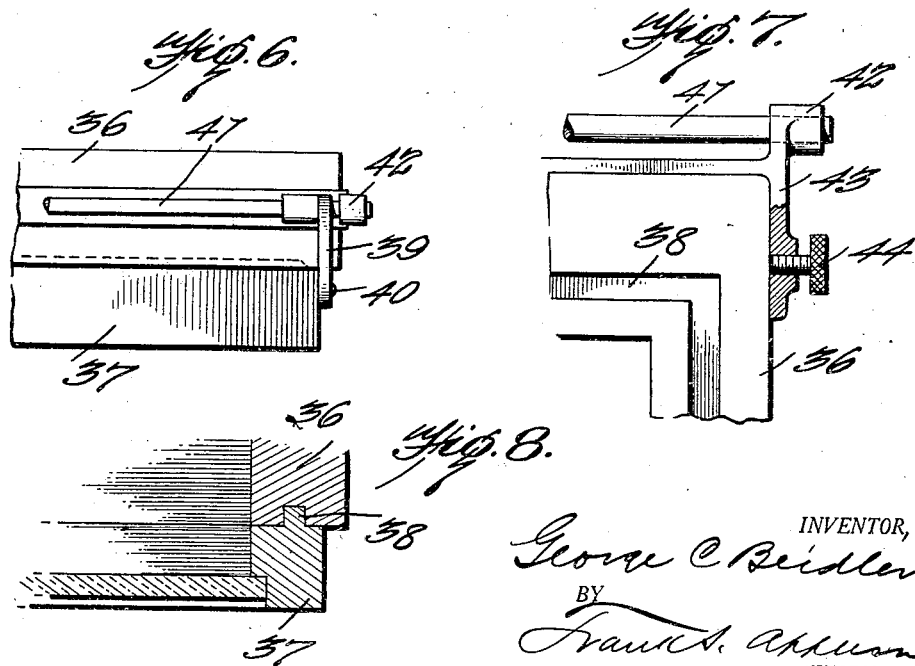

Patented Jan. 14, 1930

1,743,311

UNITED STATES PATENT OFFICE

GEORGE C. BEIDLER, OF ROCHESTER, NEW YORK

PHOTOGRAPHING APPARATUS

Application filed February 2, 1927. Serial No. 165,417.

This invention relates to photographing apparatus, and particularly to apparatus intended for use in commercial photography where documents, books, papers and objects are to be photographed in commercial plants. It is well known that in the commercial photographing art, the operator is called upon to produce photographs which are enlargements or reductions of the copy or subject submitted for reproduction, and to produce the different enlargements or reductions, the camera or photographing apparatus must be adjusted for the purpose of focusing the image and securing the proper field of exposure on the sensitized element. Cameras or photographing apparatus of this general type are relatively large, and while observation through ground glass is relied upon for focusing purposes, the ground glass in a frame is applied to and removed from the camera box or casing, and during the focusing operation the camera box or casing is moved toward or away from the lens, an interposed bellows of conventional type being employed; and in such commercial photographing apparatus, a copy holder movable in character is located with respect to the light projecting means of the camera, and in order to secure proper focus, the copy holder must have movement relative to the light projecting means.

It is an object of this invention to produce novel means associated with a camera, and a copy holder, whereby the copy holder may be manipulated from a location occupied by the operator in observing the focus.

It is furthermore an object to provide means in proximity to the location of the operator when focusing for manipulating the camera body with respect to the light projecting means thereof, making it possible for an operator to attend to the manipulations incident to focusing without leaving the station of observation where the effect, due to the movement of the parts, is observed.

It is a still further object of this invention to provide novel means for mounting or installing the ground glass for focusing in such proximity and relation to the camera body as to be movable into and out of operative relation with an exposing chamber of the camera and to facilitate the assembly of the ground glass with respect to the camera casing.

Furthermore it is an object of the invention to provide a mounting for the ground glass, capable of supporting the said ground glass clear of the operating parts of the apparatus and in location where it may be manipulated expeditiously for applying it to or removing it from the camera body.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a view in elevation of parts of a photographing apparatus embodying the invention;

Figure 2 illustrates an enlarged sectional view of fragments thereof;

Figure 3 illustrates a view in elevation of the said apparatus with parts in different positions of adjustment;

Figure 4 illustrates a view in elevation of the parts of the device in positions differing from that shown in Figs. 1 and 3;

Figure 5 illustrates an enlarged detail view of a part of a camera body, showing the holder for the ground glass applied thereto;

Figure 6 illustrates a plan view of a fragment of the ground glass mounting;

Figure 7 illustrates an enlarged detail view of said mounting;

Figure 8 illustrates a sectional view on the line 8—8 of Fig. 5;

Figure 9 illustrates a view in front elevation of a modified ground glass mounting;

Figure 10 illustrates a side elevation thereof; and

Figure 11 illustrates a sectional view of the ground glass frame and its guide.

In these drawings, 15 denotes a stand or base having rails such as 16, preferably tubular in cross section, on which traction wheels or rollers 17 may travel, for moving the camera body, which is generally identified by the numeral 18, through the shaft 19, by which the camera body is supported. The details of construction for connecting the camera body to the shaft need not, it is thought, be further disclosed for an understanding of the same by one skilled in the art. The shaft 19 is rotatable in bearings provided in association with the camera body, and a sprocket wheel 20 is rotatably mounted on the shaft externally of the said body. A crank 21 connected to the sprocket wheel is used for rotating the sprocket wheel and the said sprocket wheel is engaged by a chain 22 that operates over a sprocket wheel 23. A link 24 is oscillatable on the shaft 19 and a link 25 is oscillatable on a shaft 26, and these links are pivotally mounted on the shaft 27 and form a toggle which swings as the camera body is moved longitudinally of the frame. The sprocket wheel 23 is mounted on the shaft 27 and a sprocket wheel 28 is also mounted on the shaft 27. The sprocket wheel 28 is engaged by a sprocket chain 29 operating over a sprocket wheel 30 on the shaft 26, and as the shaft 26 is turned, a copy holder 31 is raised or lowered, according to the direction of rotation of the shaft 26, through means of gearing such as is usually employed in copy holder gearing in this art.

A hand wheel 32 is secured on the shaft 19 and its rotation imparts movement to the wheels or disks such as 17 for manipulating the camera body with relation to the light projecting means of the camera, conventionally shown at 33. It will be understood, of course, that the means for supporting the camera body shown in Fig. 2 are duplicated on each side of the frame and that when the shaft 19 rotates, it will cause the travel of the wheels 17 on the rails 16.

In the commercial camera of this illustration, the sensitized material when being exposed is in the location indicated by the numeral 34 and a part of the camera body 35 is movable away from the part 36. Usually the part 35 is hinged to swing away from the part 36, and in focusing, a ground glass is applied to the edge of the frame of the camera body, from which the part 35 has been moved.

In order that the focusing operation may be expedited, as heretofore stated, a frame 37 which holds the ground glass is supported in proximity to the section 36 of the camera frame and after the section 35 has been swung outwardly clear of the section 36, the glass frame 37 is moved into position occupied by the section 35 of the camera body. There is preferably a tongue and groove connection or joint 38 between the frame 37 and the section 36 in order that a light tight joint will be maintained during the focusing operation.

In the form of the invention shown in Figs. 1, 3, etc., the ground glass frame 37 is provided with metal straps 39 on each side, secured to the frame in any appropriate manner, by fastenings such as 40, and the said straps 39 have curved extensions above the frame 37 which are secured to a shaft 41 rotatable in bearings 42 at the ends of a clamp 43, which clamp is designed to embrace a portion of the top of the camera body or the section 43 thereof and to be secured to the camera body in any suitable way, as by set screws 44. By this means, the frame of the ground glass is hingedly mounted on the camera body and located to be expeditiously moved into and out of operative relation to the exposing chamber of the apparatus. The ground glass is held normally out of the zone of operation of any other part of the apparatus and to that end, a counterweight 45 is secured on the shaft 41 and it is of a weight to counterbalance the weight of the said frame and it is operative to hold the frame suspended, as shown in Fig. 1, although, of course, other appropriate means may be supplied for retaining the ground glass frame in this position.

In providing the clamp and the mounting for the ground glass, it is possible to install the device as a unit on machines now in use without changing the structures of such machines, or to make them part of new equipment.

As showing another means for movably maintaining the ground glass frame in operative relation to the camera body, reference is made to Figs. 9, 10 and 11 of the illustration, and in this form, the camera body, where the focusing occurs at 46, is provided with upwardly extending posts or guides 47 and the frame 48 for the ground glass is mounted for movement vertically of the face of the exposing chamber. It is shown that there is a tongue and groove connection or joint 49 between the frame and its guide for maintaining a light tight joint between the movable frame and the stationary parts of the guide and camera body. The camera body has tongues 50 which form continuations of the tongues of the guides 47. In the form of the invention just mentioned, a post 51 is provided at each side of the camera body and they extend upwardly thereabove. A roller 52 is mounted on each post for engaging a flexible element 53 such as a cable or the like, and each flexible element may be connected to the frame 48 as at 54, and each flexible element may be provided with a counterweight 55, which will tend to support the frame in its elevated position. When focusing is to occur with this form of the device, the ground glass frame may be pulled down, after the exposing chamber is clear, and, of course, when the focusing has been accomplished, the ground glass frame may be elevated and held suspended, as it is shown in Fig. 9.

It will thus be seen from the disclosure that an operator may expeditiously adjust the camera for focusing and that while in position to observe the result of the manipulation, he may have within his reach, instrumentalities for moving the camera body relative to the light projecting means, and also instrumentalities for adjusting the copy holder relative to the said light projecting means, and this, compared with the known means for changing the focus of apparatus of this kind, will undoubtedly be regarded as possessing advantages.

It will be understood that in this apparatus, the means for exposing film to light may include a camera case or exposing chamber, light projecting means such as a lens and prism, and that by the term "camera case", applicant intends to include any of the conventional types of chambers for exposing sensitized material to light.

I claim:

In a photographing apparatus, a camera case, a focusing instrumentality associated therewith, means for moving the camera case with relation to a light projecting means, a copy holder, means for mounting the copy holder with relation to the said light projecting means, means for moving the copy holder with relation to said light projecting means, a link oscillatably mounted with relation to the copy holder structure, a link oscillatably mounted on the camera structure and movable with the camera case during the focusing adjustment, a shaft on which the said links are pivoted at their ends remote from the copy holding structure and the camera structure, respectively, wheels on the said shaft, manually operated means movable with the camera structure for rotating one of the wheels, and means connecting the other of said wheels and the mechanism for moving the copy holder.

GEORGE C. BEIDLER.